United States Patent [19]

Esters

[11] 4,233,532
[45] Nov. 11, 1980

[54] MODULAR DYNAMOELECTRIC MACHINE

[76] Inventor: Ernie B. Esters, 15915 Rutherford, Detroit, Mich. 48227

[21] Appl. No.: 923,175

[22] Filed: Jul. 10, 1978

[51] Int. Cl.³ .......................................... H02K 37/00
[52] U.S. Cl. ................................... 310/46; 310/112; 310/114; 310/71
[58] Field of Search .................. 310/46, 71, 112, 114, 310/126

[56] References Cited

U.S. PATENT DOCUMENTS

| | | | |
|---|---|---|---|
| 1,578,096 | 3/1926 | Sandell | 310/46 |
| 1,741,460 | 12/1929 | Hendricks | 310/46 |
| 2,070,790 | 2/1937 | Hammes | 310/46 |
| 2,098,646 | 11/1937 | Lewis | 310/46 X |
| 2,864,964 | 12/1950 | Kobev | 310/112 |
| 3,255,367 | 6/1966 | Schaefer | 310/112 X |

*Primary Examiner*—Donovan F. Duggan
*Attorney, Agent, or Firm*—Hauke and Patalidis

[57] ABSTRACT

A dynamoelectric machine comprising a plurality of single functional modular units mounted end to end on a common output shaft. Each individual unit comprises a rotor consisting of a single cylindrical coil or winding having its axis at a right angle to the shaft longitudinal axis, a pair of outer stators preferably in the form of permanent magnets and two pairs of end stators, each pair of end stators on one side of the coil. Each modular unit, when operating as a DC unit, is provided with its own commutator consisting of a split ring and, when functioning in a motor mode, all the commutator brushes of an assembly of modular units are connected in parallel across a common DC power supply. When operating in a generator mode, all the modular units are connected to a common lead. Output power can be tailored by mounting an appropriate number of modular units end to end in a housing.

10 Claims, 6 Drawing Figures

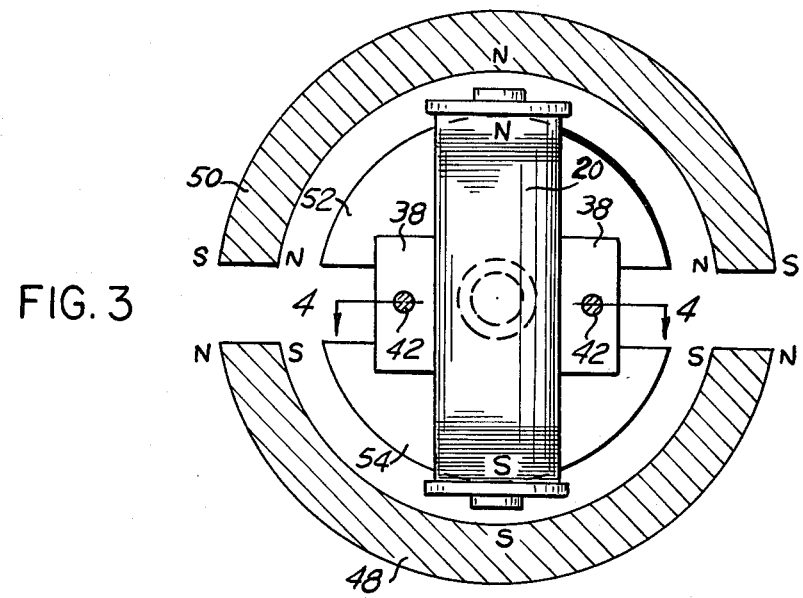
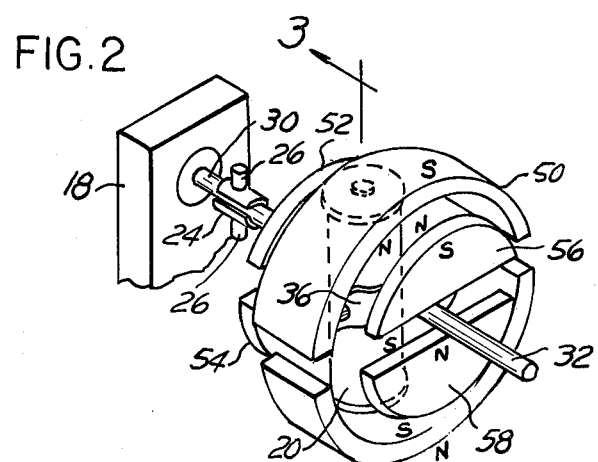
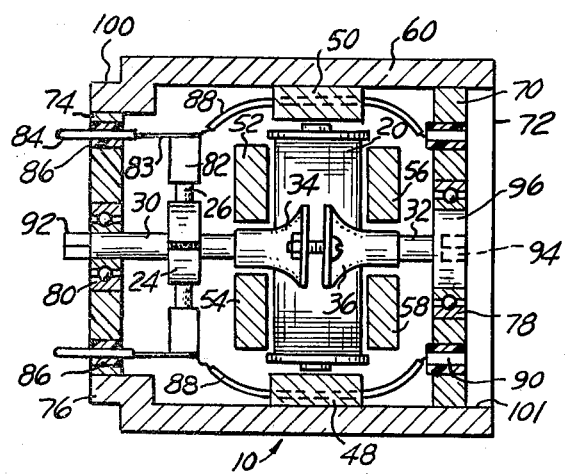

MODULAR DYNAMOELECTRIC MACHINE

BACKGROUND OF THE INVENTION

The present invention relates to dynamoelectric machines capable of operating either in a motor mode, or in a generator mode, a machine of a desired output being made of an appropriate number of modular units disposed end to end so as to drive a common output shaft, or be driven by a common input shaft.

Dynamoelectric machines are generally built in diverse power outputs, machines of different outputs being of different overall sizes. The size, such as overall length and overall diameter, increases as a function of the power output. This requires that a given design of a dynamoelectric machine, such as an electric motor or an electric generator, be scaled by extrapolation and interpolation according to the desired power output to be obtained. Consequently, in mass production, different and separate manufacturing and assembly lines must be provided in a manufacturing plant, one line for each dynamoelectric machine of a given power output. In the alternative, a batch of dynamoelectric machines of a given power output must be manufactured and the finished machines stored. The manufacturing and assembly line is then changed and reset for producing machines of a different power output which is turn must be stored until stocks of machines are exhusted, at which time the manufacturing and assembly line must be again reset A large inventory of many different parts and part sizes must be carried at all times.

The present invention remedies such inconveniences by providing singular modular units which, in a given range, are all the same in dimension and structure, and by permitting to obtain dynamoelectric machines of appropriate power outputs according to the number of modular units coupled end to end to a single output or input shaft. The result is that only a single manufacturing and sub-assembly line is required in a manufacturing plant, the inventory of components and sub-assemblies is considerably reduced, and motors or generators of required outputs may be provided on demand, at lost cost and on short delivery terms.

Another advantage of the present invention is that only a single dimension, the length of the dynamoelectric machine, within a range of outputs, increases as a function of output power, while the diameter of the dynamoelectric machine remains constant.

SUMMARY OF THE INVENTION

The present invention has therefore for principal object to mass produce electric motors or generators at high production rates and at relatively lower costs, by providing single modular units of a given power output capable of being coupled end to end to a single output shaft, when operating in a motor mode, or to a single input shaft, when operating in a generator mode, the total power output of a dynamoelectric machine according to the invention being the nominal output of each single modular unit multiplied by the number of units mounted on a single shaft.

These and other objects and advantages of the present invention will become apparent to those skilled in the art when the following description of the best mode contemplated for practicing the invention is read in conjunction with the accompanying drawing wherein like reference numerals refer to like or equivalent parts, and in which:

BRIEF DESCRIPTION OF THE DRAWING

FIG. 2 is a schematic perspective view of a dynamoelectric machine modular unit according to the present invention;

FIG. 3 is a sectional view from line 3—3 of FIG. 2;

FIG. 6 is a longitudinal section of one of the modular units of FIG. 5 at an enlarged scale.

DETAILED DESCRIPTION OF THE PREFERRED EMBODIMENTS

The principle of the present invention is applicable to dynamoelectric machines operating in a motor mode as well as in a generator mode, to alternating current dynamoelectric machines as well as direct current dynamoelectric machines, and to dynamoelectric machines of the type wherein inter-reacting fields are provided by electromagnets as well as by permanent magnets. However, for the sake of simplifying the description of structures incorporating the principle of the invention, the present invention will be described as adapted to a modular construction for DC electric motors having permanent magnets for producing a magnetic field in which a coil, or winding, forming a rotor, is rotatably displaced, such coil or winding being supplied with electricity from a source of direct current.

Figure 1:
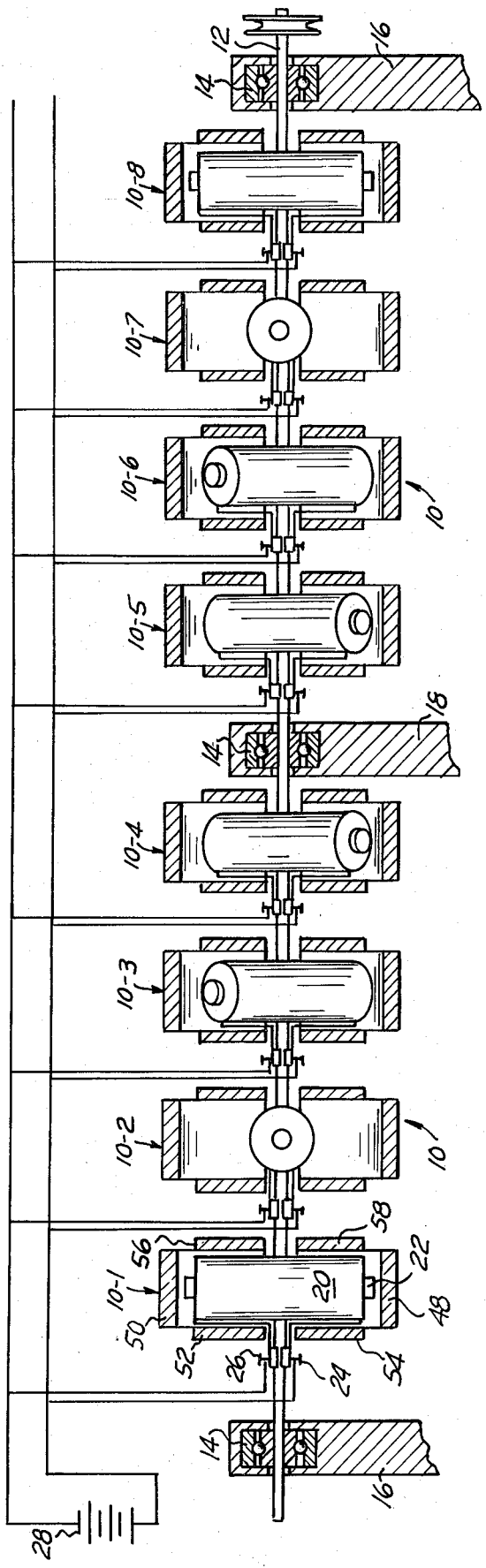
FIG. 1 is a schematic illustration of a built-up dynamoelectric machine according to the present invention.

Referring now to the drawing, and more particularly to FIG. 1, a DC electric motor according to the present invention comprises a plurality of unitary modular motor elements or units 10 mounted end to end such as to drive a common output shaft 12. Appropriate bearing means, such as ball bearings 14, support individual shaft members which, as hereinafter explained in detail, are mounted end to end so as to form a single shaft mechanically connected to the output shaft 12. The bearings 14 are fitted in end plates 16 and in intermediary support brackets 18, only one of which is shown at FIG. 1, which are in turn fastened to a housing, not shown, in which a plurality of individual modular motor elements 10 are mounted end to end. Alternatively, and preferably, the modular elements or units 10 are provided with individual elementary housings assembled end to end, as will be explained hereinafter in further detail.

Figure 4:
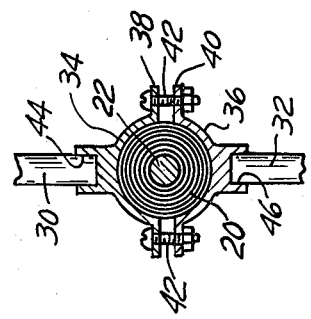
FIG. 4 is a view from line 4—4 of FIG. 3.

As shown at FIG. 1, and in more details at FIGS. 2-4, each modular unit 10 comprises an electrical coil or winding 20 consisting of multiple layers of a length of electrical wire wound about a rod-like magnetically permeable core 22. Each end of the coil 20 is connected, by soldering for example, to one of the sectors of a two-sector split ring commutator 24. A pair of brushes 26, for each modular unit 10, is connected across a DC power supply. Each modular unit 10 has its own two-sector commutator 26, and all the brushes 24 are connected in parallel, by pair, across the power supply 28.

The windings 20 are, as is conventional in the art, covered with a varnished paper layer or canvas and are held between two stub shaft members 30 and 32, as best shown at FIG. 4, by being clamped therebetween. For that purpose, the corresponding ends of the stub shafts 30 and 32 are each provided with a half clamp 34 and 36, respectively, each having a pair of flanges 38 and 40, respectively, a pair of screw and nut assemblies, such as shown at 42, being used for clamping the coil 20 between the half clamps 34 and 36. Each half clamp 34 or 36 has a longitudinally aligned bore 44 and 46, respectively, in which is press-fitted or otherwise fastened the end of the stub shafts 30 and 32, respectively. Each stub shaft may be integral with the subsequent stub shaft of the next adjacent modular unit 10, or, preferably, a simple coupling, not shown, may be provided to interconnect the stub shafts 32 and 30 of juxtaposed modular units 10, in which case it is preferable to provide a support bracket, such as support bracket 18 of FIG. 1, between adjacent consecutive modular units 10.

Each modular unit 10 whose rotatable coil or winding 20 defines a rotor, is provided with a stator in the form of a plurality of magnets, electromagnets or, preferably and as shown, permanent magnets. In the structure illustrated, a first pair of permanent magnets 48 and 50, FIGS. 2 and 3, is disposed peripherally. Each of the magnets 48 and 50 is partially annular and is disposed concentric to the axis of rotation of the stub shafts 30 and 32 rotatably supporting the coil or winding 20. The permanent magnets 48 and 50 are radially polarized, such that, for example, the magnet 48 has a South pole (S) directed inwardly and a North pole (N) directed outwardly, while the magnet 50 is of opposite polarity, that is with a North pole directed inwardly and a South pole directed outwardly.

Two additional pairs of end stator permanent magnets are disposed laterally to the coil or winding 20. Each pair consists of two generally half-disc shaped magnets 52 and 54 and 56 and 58, having their plane of symmetry disposed in a plane perpendicular to the axis of rotation of the coil or winding 20. A pair of magnets is disposed on one side of the coil or winding 20 and the other is disposed on the other side of the coil or winding 20.

In the example illustrated, the magnets 52-58 are transversely magnetized such that the magnets 52 and 56 present a North pole towards the coil or winding 20 and the magnets 54 and 58 present a South pole on their side proximate to the coil or winding 20.

In this manner, the coil or winding 20 in the course of a single revolution about its axis of rotation has one end exposed to the North pole of the magnetic field while the other end of the coil or winding is simultaneously exposed to the South magnetic pole. If the current circulating through the coil or winding 20 at that time circulates in a direction that causes a North pole to be induced in the end of the coil or winding located proximate to the South pole of the stator, while the other end of the coil or winding induces a South pole proximate the South pole of the stator field, the coil or winding 20 is subjected to a torque as a result of the repelling action exerted by magnetized elements of same polarity, which causes the coil or winding 20 to rotate about its axis of rotation. After having revolved approximately 180°, the angular positioning of the two halves of the commutator 24 relative to the brushes 26 causes a reversal of the current direction through the coil or winding 20, and by proper timing of the reversal of current and therefore induced magnetic field, the coil or winding 20 is urged in continuous rotation about its axis of rotation.

In view of the relatively large inertia of the elements in rotation, consisting of the coil or winding 20 and its magnetic core 22, the clamp portions 34-36 and the stub shafts 30-32, there is an effective damping of any tendency for the coil or winding 20 to periodically accelerate or decelerate during a single revolution due to being subjected to a variable magnetic field while rotating through 360°. When a plurality of modular motor units 10 are coupled end to end to a single output shaft 12, as schematically illustrated at FIG. 1, wherein eight modular units 10 are shown coupled to the output shaft, the orientation of the rotor coils or windings about their common axis of rotation is preferably staggered at a constant increment of angular position to provide a constant torque at the output. For example, and as illustrated at FIG. 1, the modular units 10-1 and 10-8 may be arranged to have their respective coils or windings 20 parallel to each other, the modular units 10-2 and 10-7 having also their respective coils or windings parallel to each other but disposed at 90° relative to the coils or windings of the modular units 10-1 and 10-8. The coils or windings of modular units 10-3 and 10-6 are parallel to each other, but are at a 45° angle away from the pair consisting of modular units 10-2 and 10-7. The pair consisting of the coils or windings of modular units 10-4 and 10-5 are parallel to each other, but at a 90° angle away from the position of the pair consisting of modular units 10-3 and 10-6. In other words, and as illustrated at FIG. 1, the modular units 10-1 through 10-8 are coupled by pairs, each pair being angularly oriented in a staggered manner every 45°. It will be appreciated that, if so desired, the eight modular units 10 represented at FIG. 1 could be arranged so that the coil or winding of each separate unit is positioned on a common shaft 22° 30' relative to each other, in order to provide an even more constant torque at the output. If N modular units are coupled to a common shaft and it is desired to regularly stagger the modular units about their axis of rotation, modular units are uniformly angularly staggered at an angle a which is obtained by the formula:

$$a = 180/N$$

If the modular units are disposed by pairs, the pairs are mutually angularly oriented at an angle a according to the formula:

$$a = 360/N$$

Figure 5:
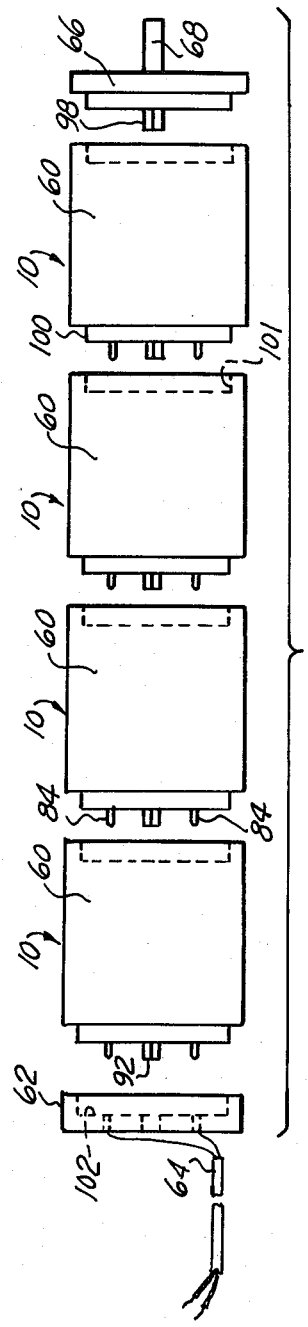
FIG. 5 is an exploded view of a dynamoelectric machine made of a plurality of modular units, according to the invention, assembled end to end.

The modular units 10 may be assembled in a common housing but, preferably, each unit is housed in a separate housing as shown at FIG. 5. FIG. 5 is an exploded view of an example of structure illustrating how the modular units 10 of the invention, mounted in separate housings, can be coupled in an assembly providing, for example, a DC electric motor of an appropriate power. In the example illustrated, four modular units 10 are connected end to end, each being enclosed in a cylindrical housing 60, end plate 62 providing an electrical power input to the motor by means of a line 64 being mounted on, for example, the left end, as seen in FIG. 5, of the leftmost modular unit 10, and an end plate 66, provided with an output shaft 68, being mounted on the right end of the right most modular unit 10.

As shown at FIG. 5, and in more detail at FIG. 6, the cylindrical housing 60 of each modular unit 10 has a face plate 70 slightly recessed relative to the end flange 72 of the housing 60, and a face plate 74 disposed flush with the other end flange 76 of the housing 60. The face plate 70 supports the stub shaft 32 rotatably by means of ball bearings 78, and the face plate 74 supports the stub shaft 30 by means of ball bearings 80. The coil or winding 20 is mounted between the two stub shafts 30 and 32 by means of the clamp elements 34-36, as previously explained, and peripheral permanent magnets 48 and 50 and lateral magnets 52-58 are mounted within the housing 60, as shown, by any appropriate means such as being held in position by mounting brackets or flanges, not shown, the peripheral magnets 50 and 48 being preferably cemented or otherwise attached to the inner surface of the housing 60.

The brushes 26 cooperating with the commutator 24 are supported each in a brush holder 82 mounted in the end of a flat spring 83 having its other end mechanically and electrically connected to a contact pin 84, insulated from the face plate 74 by an insulation sleeve 86, the end of the contact pin 84 projecting on the outside of the face plate 74. Each brush 26 is also connected by way of its respective brush holder 82 and a wire 88 to an insulated socket 90 or face plate 70 accepting the projecting end of the pin 84 of an adjacent modular unit 10, such that all the brushes are connected in parallel when a plurality of modular units 10 are coupled end to end. Preferably, there is a plurality of circularly disposed sockets 90, all of which are interconnected in each 180° sector, each socket 90 being disposed relative to the next consecutive socket of an appropriate angular position, such that a multiplicity of modular units 10 may be coupled end to end, each one being staggered relative to the preceding unit by a predetermined angle as previously described, by engaging the pair of projecting pins 84 of one unit to an appropriate pair of sockets 90 of the other.

The coupling between the stub shafts 30 and 32 of adjacent modular units is accomplished by, for example, providing stub shaft 30 with a square or hexagonal end 92, projecting from the face plate 74, which fits the square or hexagonal socket 94 formed in an enlarged diameter end portion 96 of the stub shaft 32 of the adjacent modular unit 10, thus permitting a plurality of modular units 10 to be coupled end to end and to the common output shaft 68 journalled in the end plate 66, FIG. 5. The output shaft 68 is also provided with a projecting square or hexagonal end 98 for coupling with the socket 94 in the enlarged portion 96 of the stub shaft 32 of the modular unit 10 onto which the end plate 66 is mounted. The left side, as shown in the drawing, of the housing 60 of each modular unit 10 is provided with a reduced diameter peripheral portion 100 which fits within the interior 101 of the adjacent modular unit. The reduced diameter peripheral portion 100 of the housing 60 of the leftmost modular unit 10 fits within a recessed side portion 102 of the end plate 62. The end plate 62 is further provided with appropriate sockets 104 to which are connected the line 64, the sockets 104 accepting the projecting pins 84 on the side of the modular unit 10 to which the end plate 62 is mounted. Appropriate bolts, not shown, passing through appropriate longitudinal bores in the walls of the housings 60 are used for clamping together the plurality of modular units 10, the bolts also passing through appropriate apertures in the end plates 62 and 66.

It will be appreciated that the end plate 66 may be omitted simply by providing the end plate 62 with an appropriate output shaft having a socket accepting the male coupling element 92 of the stub shaft 30. In arrangements where it is desired to provide an output shaft at both ends of the assembly, an end plate 66 is mounted on one end of the assembly and a modified end plate, having also an output shaft, is mounted on the other end.

Having thus described the present invention by way of a typical structural embodiment thereof, modifications whereof will be apparent to those skilled in the art, what is claimed as new is as follows:

1. A dynamoelectric machine comprising a housing, a shaft assembly rotatably supported in said housing, a winding mounted on said shaft assembly for rotation therewith, a magnetic field stator having six independent field elements disposed in said housing, said stator comprising a first pair of diametrically disposed field elements, and two pairs of laterally disposed flat field elements, each of said pairs of laterally disposed field elements being supported on opposite lateral sides of said winding, and said field elements being arranged such that one end of said winding is at a given moment within a magnetic field of a given polarity while the other end of said winding is within a magnetic field of an opposite polarity, a commutator mounted on said shaft for rotation therewith, wiring means connecting said winding to said commutator, and brush means each connected to a terminal and engaged with said commutator.

2. The dynamoelectric machine of claim 1 wherein said shaft assembly comprises a pair of stub shafts each disposed on one side of said winding and means formed at corresponding ends of said stub shafts for clamping said winding therebetween.

3. The dynamoelectric machine of claim 1 wherein said field elements are permanent magnets.

4. The dynamoelectric machine of claim 1 wherein a plurality of said windings and said shaft assemblies are mounted end to end in said housing.

5. The dynamoelectric machine of claim 4 wherein each said winding is angularly positioned relative to another.

6. The dynamoelectric machine of claim 4 wherein each said winding is positioned parallel to another and each pair of said windings is angularly positioned relative to another pair of parallely disposed windings.

7. The dynamoelectric machine of claim 1 wherein said shaft assembly is provided at its ends with interlocking means, and wherein said housing comprises a module provided at its ends with coupling means and with electrical pin and socket interconnecting means, whereby a plurality of said housing modules are mechanically and electrically interconnectable end to end, and further comprising at least one end plate having an output shaft for interconnection with one of said shafts and electrical terminals for connection to said windings.

8. A dynamoelectric machine comprising a plurality of compact independent modules each comprising a housing, a pair of stub shafts rotatably supported in said housing, a winding mounted between said stub shafts for rotation therewith, means formed at corresponding ends of said stub shafts for clamping said windings therebetween, a magnetic field stator disposed in said housing, said stator comprising a pair of diametrically disposed field elements, and two pairs of laterally disposed flat field elements, each of said laterally disposed field elements being supported on a lateral side of said winding, and said field elements being arranged such that one end of said winding is at a given moment within a magnetic field of a given polarity while the other end of said winding is within a magnetic field of an opposite polarity, a commutator mounted on said shaft for rotation therewith, wiring means connecting said winding to said commutator, and brush means each connected to a terminal and engaged with said commutator, and means for mounting at least a pair of said modules end to end, said means comprising complementary interlocking means at each end of said housing for securing said housings to each other, complementary electrical interconnecting means for electrically interconnecting said terminals and complementary mechanical coupling means for interconnecting said stub shafts.

9. The dynamoelectric machine of claim 8 wherein said first elements are permanent magnets.

10. The dynamoelectric machine of claim 8 wherein each said housing has a first and a second lateral end face plate, said face plates being disposed parallel to said flat field elements and on opposite sides of said stator, and wherein said interlocking means comprises said shaft coupling means, said electrical pin and socket interconnecting means, a recess in said first lateral face plate and a mating male member to said recess in said second lateral face plate, said shaft interlocking means and said electrical pin and socket interconnecting means being disposed on said lateral face plates.

* * * * *